United States Patent [19]

Munich et al.

[11] Patent Number: 5,182,771

[45] Date of Patent: Jan. 26, 1993

[54] ANTI-TAPING METHOD AND APPARATUS FOR A MULTIPLEXED ANALOG COMPONENT TELEVISION SYSTEM

[75] Inventors: Randy Munich, Ontario, Canada; David Ewing, New South Wales, Australia; Tsai Lo, Ontario, Canada; Wayne Sheldrick, Ontario, Canada; Baldwin Chieh, Ontario, all of Canada

[73] Assignee: Scientific Atlanta, Inc., Atlanta, Ga.

[21] Appl. No.: 677,236

[22] Filed: Mar. 29, 1991

[51] Int. Cl.⁵ ............................................ H04N 7/167
[52] U.S. Cl. ................................................ 380/5; 380/14
[58] Field of Search ................................... 380/5, 14, 20

[56] References Cited

U.S. PATENT DOCUMENTS

| | | | |
|---|---|---|---|
| 4,390,898 | 6/1983 | Bond et al. | 358/119 |
| 4,439,785 | 3/1984 | Leonard | 358/120 |
| 4,488,176 | 12/1984 | Bond et al. | 358/141 |
| 4,673,981 | 6/1987 | Lippman et al. | 358/160 |
| 4,890,319 | 12/1989 | Seth-Smith et al. | 380/5 |
| 4,914,694 | 4/1990 | Leonard et al. | 380/5 |
| 5,003,590 | 3/1991 | Lechner et al. | 380/5 |

Primary Examiner—Salvatore Cangialosi
Attorney, Agent, or Firm—Banner, Birch, McKie & Beckett

[57] ABSTRACT

An apparatus for transmitting a multiplexed analog component television signal. The apparatus includes a signal source generator for generating a signal source having information regarding the number of lines per frame. A multiplexed analog component television signal generator generates a multiplexed analog component television signal having a varying number of lines per frame and including information regarding the number of lines per frame. A transmitter coupled to the multiplexed analog component television signal generator transmits the television signal to at least one remote terminal.

4 Claims, 13 Drawing Sheets

FIG. 6 PRIOR ART

LINE 1: HORIZ.DATA--78 SYMBOLS | 1 | 0 | 1 | 0 | 1 | 0 | 1 | 0 | ... | 0 | 1 | 0 | 1 | 0 | 1
- SYMBOL 79
- SYMBOL 455
- CLOCK RECOVERY
- 68

FIG. 7 PRIOR ART

LINE 2: HORIZ.DATA--78 SYMBOLS | 1 | 1 | 1 | 1 | 0 | 0 | 0 | 0 | ... | 1 | 1 | 1 | 1 | 0 | 0 | 0 | FD
- SYMBOL 79
- SYMBOL 455
- PHASE REVERSAL
- FRAMING RECOVERY (FD=FIELD IDENTIFICATION)
- 70

FIG. 8 PRIOR ART

LINE 3: HORIZ.DATA--78 SYMBOLS | 0 | $M_1$ | $P$ | $M_1$ | $P$ | $M_2$ | $P$ | $M_2$ | ... | $M_{62}$ | $P$ | $M_{62}$ | $P$ | $M_{62}$ | $P$
- SYMBOL 79
- SYMBOL 455
- KEY (M=MESSAGE, P=PARITY)
- 72

FIG. 16(A)

```
FIRST SCENE CHANGE>:
FIELD            A  B  A  B  A  B  A  B  A  B  A  B ...
DELTA LINES      0  0  1  2  3  4  5  6  7  8  8  8 ...
DISPLAY OFFSET   0  0  0  0  1  1  2  2  3  3  4  4 ...
V ADV/DEL        -  -  -  A  -  A  -  A  -  A  -  - ...
                       RAMP UP TO +8            HOLD TYP. 96
                       STARTUP SEGMENT
```

FIG. 16(B)

```
FIELD            A  B  A  B  A  B  A  B  A  B  A  B ...
DELTA LINES      8  8  7  6  5  4  3  2  1  0 -1 -1 ...
DISPLAY OFFSET   4  4  4  4  3  3  2  2  1  1  0  0 ...
V ADV/DEL        -  -  -  D  -  D  -  D  -  D  -  - ...
                       RAMP DOWN TO -1          HOLD TYP. 300
                       NORMAL RAMP 2
```

FIG. 16(C)

```
FIELD            A  B  A  B  A  B  A  B ...
DELTA LINES     -1 -1 -1 -2 -3 -4 -4 -4 ...
DISPLAY OFFSET   0  0  0  0 -1 -1 -2 -2 ...
V ADV/DEL        -  -  -  D  -  D  -  - ...
                       RAMP DN -4 HOLD TYP. 16
                       NORMAL RAMP 3
```

FIG. 16(D)

```
NORMAL SCENE CHANGE>:
FIELD            A  B  A  B  A  B  A  B  A  B  A  B  A  B  A  B ...
DELTA LINES     -4 -4 -3 -2 -1  0  1  2  3  4  5  6  7  8  8  8 ...
DISPLAY OFFSET  -2 -2 -2 -2 -1 -1  0  0  1  1  2  2  3  3  4  4 ...
V ADV/DEL        -  -  -  A  -  A  -  A  -  A  -  A  -  A  -  - ...
                       RAMP UP TO +8                    HOLD TYP. 96
                       NORMAL RAMP 1
```

FIG. 16(E)

```
FINAL SCENE CHANGE>:
FIELD            A  B  A  B  A  B  A  B
DELTA LINES     -4 -4 -3 -2 -1  0  0  0
DISPLAY OFFSET  -2 -2 -2 -2 -1 -1  0  0
V ADV/DEL        -  -  -  A  -  A  -  -
                       RAMP UP TO 0
                       FINAL SEGMENT
```

FIG. 16(F)

```
SEGMENT SEQUENCE:     STARTUP SEGMENT
                      NORMAL RAMP 2
                      NORMAL RAMP 3
                      NORMAL RAMP 1 <---;
                      NORMAL RAMP 2     ;
                      NORMAL RAMP 3 >---;
                      FINAL SEGMENT
```

ANTI-TAPING METHOD AND APPARATUS FOR A MULTIPLEXED ANALOG COMPONENT TELEVISION SYSTEM

BACKGROUND OF THE INVENTION

1. Field of the Invention

The present invention generally relates to a method and apparatus for modifying a television signal to inhibit the unauthorized reproduction thereof by a video tape recorder (VTR) and, more particularly, to a method and apparatus for inhibiting the unauthorized reproduction of programming in a multiplexed analog component (MAC) television system.

2. General Background

U.S. Pat. No. 4,914,694 to Leonard describes a method and apparatus for modifying a composite television signal to inhibit the reproduction of an unauthorized recording thereof by conventional video tape recorders, but to enable the display of a video picture therefrom on a television receiver. The vertical period of a television signal is modified so as to increase or decrease the vertical period with respect to nominal field intervals of 16.683 milliseconds, thereby defeating the ability of virtually all commercially available videotape recorders to record and satisfactorily reproduce a video picture from the modified television signal. By adjusting the vertical period, either by maintaining a constant number of horizontal line intervals but varying the duration of groups of those line intervals, or by adding or deleting line intervals while maintaining a constant duration of each line interval, the capstan and drum servo units normally provided in VTRs are inhibited from operating satisfactorily. However, this vertical period adjustment does not prevent the vertical sync detecting circuitry typically utilized in most television receivers from displaying satisfactory video pictures. Thus, the modified television signal cannot be adequately recorded and reproduced, but nevertheless can be satisfactorily received for video picture display on a conventional television display.

FIG. 1 (corresponding to FIG. 1 of the Leonard '694 patent) illustrates the apparatus for implementing this technique. A received television signal, which may be supplied from a video recorder or from conventional television signal generating or transmitting apparatus, is digitized by A/D converter 102 to produce pixels having respective pixel values over the active video portion of each line interval. Successive lines of pixels in each received video field are written into a field memory 104 included in memory 104 under the control of write control circuit 106. The pixels are written into the memory at a standard fixed rate synchronized with the normal horizontal synchronizing frequency $f_h$. As one field of pixels is written into memory 104, a preceding field of pixels is read from the memory under the control of read control circuit 108. The output of memory 104 is coupled to D/A converter 112 which is adapted to convert the digitized pixel values to an analog signal. D/A converter 112 is coupled to a mixer 114 which is also coupled to a synchronizing signal generator 116. The mixer functions to insert the usual horizontal and vertical synchronizing signals, burst signals and equalizing pulses conventionally used in NTSC format as well as the non-active line intervals. The output of the mixer thus comprises the modified television signal containing the original video information, but with more or less lines per frame. Time code reader/generator 122 serves to supply processor 110 with an indentification of each frame in a received television signal. This frame identification information is used by processor 110 in conjunction with profile data retrieved from profile library 118 to control the reading out of line intervals from memory 104. In order to minimize perturbations and interference in the displayed picture, changes in lengths of frames pass through standard lengths at scene changes. For this reason, scene change detector 120 is coupled to processor 110 to apprise the processor of the particular frame in which a scene change is detected. A monitor 126 is coupled to receive and display the television signal and a supervisory control 128 is coupled to processor 110 to permit a supervisor to supply a signal to the processor stopping continued changes in the vertical period.

To vary the number of lines per frame, the rate at which line intervals of pixels are read from memory 104 remains constant. A profile pattern stored in profile library 118 establishes the number of lines includes in each frame read from memory 104, and processor 110 advantageously varies the start time at which the first line of active video information is read from memory 104 by read control circuit 108.

In the event that the profile pattern calls for the number of lines included in a frame to be greater than the standard number, processor 110 commands synchronizing signal generator 116 to continue to generate nonactive (or "black") horizontal line intervals which are supplied by mixer 114 as the output TV signal. The processor also commands read control circuit 108 to delay the time at which the stored lines of active video information are read from the memory. Hence although the same number of active lines are included in the output TV signal, the total number of lines therein is greater than the standard number because synchronizing signal generator 116 supplies "extra" black lines. Alternatively, if less than the standard number of lines is to be included in a frame, thereby reducing the frame length, processor 110 interrupts the generation of black horizontal line intervals by sychronizing signal generator 116, and concurrently advances the time at which read control circuit 108 reads the stored lines of active video information from memory 104.

U.S. Pat. Nos. 5,003,590; 4,439,785; 4,673,981; 4,390,898; and 4,488,176 disclose methods and apparatus for preventing unauthorized taping of programming and are incorporated herein by reference.

While this system has been utilized in NTSC and other composite television systems, other signal types may, for example, be utilized in satellite television systems. A MAC color television signal is illustrated in FIG. 2, which is an amplitude-vs.-time diagram of a single video line of 63.56 microseconds duration. The first 10.9 microseconds is the horizontal blanking interval (HBI) 22, in which no picture information is transmitted. Following HBI 22 are chrominance signal 24 and luminance signal 26, either of which may be time-compressed. Between chrominance signal 24 and luminance signal 26 is a 0.28 microsecond guard band 28, to assist in preventing interference between the two signals.

The MAC color television signal of FIG. 2 is obtained by generating conventional luminance and chrominance signals (as would be done to obtain a conventional NTSC or other composite color television signal) and then sampling and storing them separately. Luminance is sampled at a luminance sampling frequency and stored in a luminance store, while chrominance is sampled at a chrominance sampling frequency and stored in a chrominance store. The luminance or chrominance samples may then be compressed in time by writing them into the store at their individual sampling frequency and reading them from the store at a higher frequency. A multiplexer selects either the luminance store or the chrominance store, at the appropriate time during the active video line, for reading, thus creating the MAC signal of FIG. 2. Audio samples may be transmitted during the HBI; these are multiplexed (and may be compressed) in the same manner as the video samples. The single rate at which all samples occur in the MAC signal is called the MAC sampling frequency.

As is conventional in television, thirty "frames" each comprising a still image are transmitted per second. Each frame includes two "fields". In a preferred embodiment of the invention, the video encoding scheme employed is that referred to generally as "B-MAC." This is an acronym for type B format, Multiplexed Analog Component system. "Type B" refers to the fact that data is carried integral to the video signal. See generally Lowry, "B-MAC: An Optimum Format for Satellite Television Transmission," *SMPTE Journal*, November 1984, pp. 1034-1043, which discusses in detail the B-MAC format and explains why it was chosen over various competing systems and is incorporated herein by reference.

The vertical blanking interval (VBI) of each field contains certain "system data" necessary for operation of a satellite television system, as well as addressed packets and teletext lines used to carry data needed for the operation of individual decoders and for transmission of messages to individual subscribers. Preferably, the vertical blanking intervals of sixteen total fields are used for complete transmission of all system data required, which includes an encryption key which is changed every sixteen fields, that is, on the order of three times per second. Each line also includes a horizontal blanking interval (HBI). During the HBI are transmitted six channels of high quality digitally-encoded audio information, with error correction, such that the decoder can also be used to supply a high quality audio signal. This can be used to provide the audio component of the corresponding video signal (or several versions thereof, in different languages) or an additional audio signal, such that subscription audio is also made available according to the system of the invention.

FIG. 3 shows the format of the horizontal blanking interval (HBI). Preferably, the HBI consists of 78 total bits of pulse amplitude modulated (PAM) data. The HBI is interposed between vertical blanking interval or video information from a previous line and that of the present line. A typical horizontal blanking interval as shown begins with a two-bit guard band 30, followed by 45 bits of audio and utility data 32, a second two-bit guard band 34, twenty bits of color burst information 36, a further guard band 38, six more bits of data 40 and a final guard band 42, after which the VBI or the video signal of the particular frame commences. The position of the color burst 36 within the HBI varies, to provide signal scrambling.

FIG. 4 shows some additional details of the horizontal blanking interval data 32 and 40 shown in FIG. 3. In the example shown, fifty-one total bits of data are provided in each line of the HBI, and each bit is four-level FSK encoded, such that each bit period includes transmission of two bits. One bit can be referred to as sign and the other as magnitude as indicated on FIG. 4. As shown, the first seventy-eight bits are digital audio; thus each frame provides a thirteen-bit digital representation of a sample of each of six audio channels. High quality transmission of audio frequencies up to approximately 15 kHz is thus provided. Following the audio information are six bits of stepsize and bandwidth information. The stepsize bits indicate the size of the steps numbered by the thirteen bits of information preceding, and the bandwidth information relates to the amount of the amount of emphasis or de-emphasis of the signal employed. Alternate fields carry the stepsize and bandwidth data. Both these terms are used as conventional in the Dolby delta modulation scheme, which is employed in the preferred embodiment of this invention for transmission of the audio. Following are twelve bits of error correction code (ECC) for correction of the audio, indicated at 48. Four utility bits follow at 50, and the last bit 52 of the data are a parity check bits for checking the parity of the error correction bits 48.

FIG. 5 shows the arrangement of the lines which make up the vertical blanking interval (VBI). The VBI includes 16 lines in the 525-line NTSC version of this invention. A slightly different number of lines are used in the 625-line PAL embodiment of this invention. The functions of the lines and their arrangement in other respects are identical.

As indicated, the vertical blanking interval is 377 bits wide. Lines 1, 2 and 3 includes the transmission of clock recovery, synchronization and system service data, as indicated in FIG. 5.

Among the data contained in line 3 is a system key which is updated every sixteen fields, that is, which changes with each complete system data transmission. The system key is common to all decoders. The system key is contained in the system data of line 3, and is used for decryption of video program material, audio and teletext. The system key is preferably transmitted in encrypted form.

Lines 4-8 of the VBI include the addressed packets, as indicated by reference numeral 62. As noted, these each contain an address which is then followed by data, concluding with error correction coding (ECC). The addresses are those of the individual decoders. The addresses in the address packets are transmitted in the clear, such that they can be received without decryption by the receiver. The remainder of the message is preferably encrypted. Addressed packets addressed to differing decoders may be transmitted in a single field.

As indicated at 64, lines 9-13 of the VBI are used to transmit teletext. The first part of each teletext line is a teletext identification which indicates that the line in fact is teletext. As shown, two types of teletext lines are used. Teletext headers include a relatively larger number of flags, and indicate which of the following teletext lines are part of a particular "page" or message. The text lines themselves include a somewhat lesser number of flags and text data; typically forty ASCII-encoded bytes are sent per text line, and up to twenty lines can be displayed on the user's screen at once.

FIG. 6 shows in additional detail the clock recovery data of line 1 of the VBI. As indicated, its first portion 68 is the seventy-eight symbols of the HBI. Thereafter, line 1 includes a series of 1's and 0's which are used to synchronize the clock of the decoder.

FIG. 7 shows line 2 which is used for framing recovery, that is, for synchronization of the video signal.

Again, the first portion 70 is the seventy-eight symbols of the HBI data; this is followed by framing recovery data, which consists of two repetitively transmitted eight bit sequences. One is the inverse of the other; the change from one to the other is made at the point marked "phase reversal." This line is used for framing recovery, i.e., for correct synchronization of the received video signal.

FIG. 8 shows in some additional detail the make-up of line 3. It begins with the seventy-eight symbols of HBI data indicated at 72, followed with a bit which is not used, and a number of message bits, each of which is immediately followed by a parity bit. The message bits shown in line 3 of FIG. 8 are each repeated three times and are each protected by parity bits, such that of some 378 total bits, only sixty-two bits of useful data are provided. This data comprises the "system data" used by the subscription television system of the invention to keep control of a wide variety of system functions. Three different versions of line 3 are required to transmit all the system data needed, and each is transmitted in five successive fields, such that the total system data transmission consumes fifteen total field transmissions. A sixteenth field is not used for transmission of system data. Most pertinent to the present invention is the fact that the system data transmitted in line 3 includes a service key which is changed every 16 frames, i.e., on the order of three times per second. This service key must, of course, be accurately received for the decoder to work properly. Therefore, it is transmitted redundantly, as outlined, and in combination with extensive parity-based error correction to ensure correct reception of the service key, as well as the other system data.

As discussed in Baylin et al., *Ku-Band Satellite TV—Theory, Installation, and Repair*, p. 122, a MAC system affords a number of advantages over a composite TV system. For example, time division multiplexing avoids any interaction between various signal components and can result in better quality reproduction. Color distortion is minimized and the available color bandwidth is increased.

Further, a B-MAC system is a conditional access system with scrambling, making it difficult for a subscriber to receive a program if he or she is not authorized. It is desirable to provide anti-taping in a system which not only has better color and video quality, but which also has protection against piracy. This could be accomplished by providing an anti-taping encoder at the location of B-MAC decoder. The video output by the anti-taping encoder could then include the variable frame lengths to prevent taping. However, to provide such an encoder requires a significant amount of video memory and it becomes prohibitively expensive to provide such encoders on a network-wide basis. It is also possible that a pirate could tap off the B-MAC decoder output before it enters the anti-taping encoder and thus compromise the effectiveness of the system.

Alternatively, encoding the control signals at the headend would be problematic because it disrupts field timing on normal MAC signals, and it is difficult if not impossible, for the decoder to maintain synchronization. That is, although a television is capable of synchronizing onto a signal having varying field length, a MAC decoder can not similarly synchronize onto a B-MAC signal having varying field lengths because of the differences in transmitting synchronization information. In MAC, one line of sync information is transmitted every field. Thus, there is only one reference per field. The varying field length makes it difficult for the decoder to determine where next field is going to start and the decoder almost immediately loses synchronization.

Stated differently synchronization recovery in B-MAC and many other scrambling systems such as VideoCipher is accomplished by means of a digital synchronization word transmitted once per field. Sync recovery must be extremely accurate and it is desirable not to dedicate a large portion of a channel to synchronization. When a prior art anti-taping system such as that described above is implemented, much stress is placed on sync recovery since the sync word is moved around.

SUMMARY OF THE INVENTION

Accordingly, it is an object of the present invention to provide a method and apparatus for inhibiting the unauthorized reproduction of programming delivered by a MAC or similar scrambling television system.

It is a further object of the present invention to provide a method and apparatus for inhibiting the unauthorized reproduction of programming which interfaces with a cable scrambler.

It is another object of the present invention to provide a method and apparatus for inhibiting the unauthorized reproduction of programming which interfaces with closed captioned decoders.

It is yet another object of the present invention to maintain synchronization between a MAC signal and a decoder as the number of lines per frame is varied.

In accordance with the present invention, an apparatus for transmitting a multiplexed analog component television signal is provided. The apparatus includes a signal source generator for generating a signal source having information regarding the number of lines per frame. A multiplexed analog component television signal generator generates a multiplexed analog component television signal having a varying number of lines per frame and including information regarding the number of lines per frame. A transmitter coupled to the multiplexed analog component television signal generator transmits the television signal to at least one remote terminal.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIG. 6 shows in additional detail the clock recovery data carried in line 1 of the vertical blanking interval.

FIG. 7 shows in additional detail the framing recovery data carried in line 2 of the vertical blanking interval.

FIG. 8 shows the arrangement of system data carried in line 3 of the vertical blanking interval.

FIGS. 16(A)-16(F) illustrate ramping profiles in accordance with the present invention.

DETAILED DESCRIPTION OF THE PREFERRED EMBODIMENT

Figure 9:
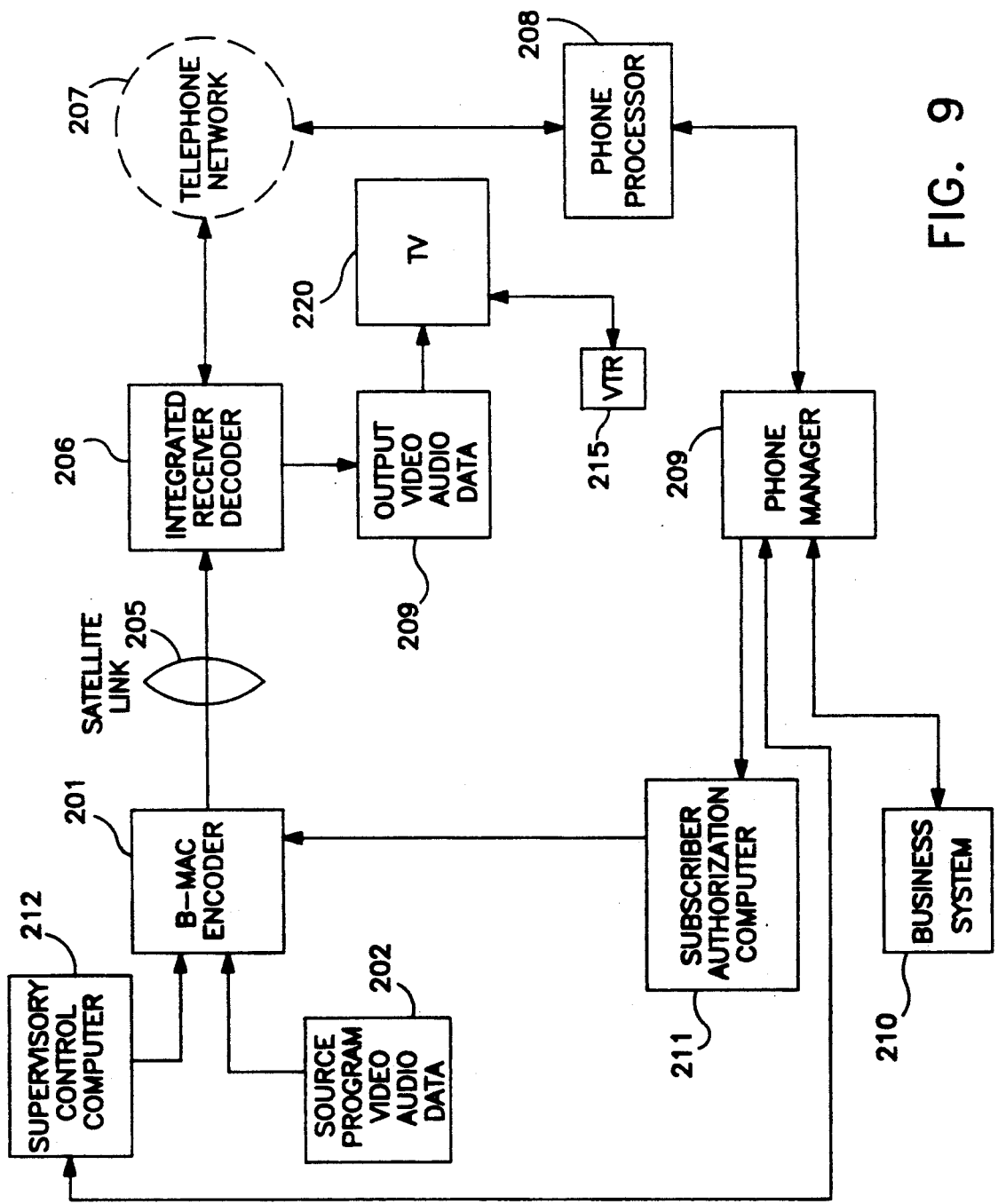
FIG. 9 illustrates a satellite television system in which the present may be implemented.

A B-MAC satellite television system in which the present invention may be implemented is shown in block form in FIG. 9. B-MAC encoder 201 encoder a source program 202 for transmission over a satellite link 205 to an integrated receiver-decoder (IRD) 206. Program source 202 may include video, audio, and data information. This data includes information relating to the number of lines per frame as will be discussed below. The source program information is scrambled in a program scrambler of B-MAC encoder 201 using a key. The scrambled programs and key are transmitted through satellite link 205. IRD 206 receives the scrambled programs and key. The key is recovered from the received signal, stored in a key memory and applied to a program descrambler which descrambles the scrambled program and outputs unscrambled program 209 for display on television 220. As will be discussed below, the picture displayed on TV 220 has an increased or decreased frame length relative to a standard frame of either 525 or 625 lines. Nonetheless, the vertical sync detecting circuitry of a typical TV 220 will cause display of a satisfactory picture. However, the variable frame length inhibits proper operation of the capstan and drum servo circuits in VTR 215. Accordingly, reproduction of the picture displayed on TV 220 by VTR 215 may be prevented.

IRD 206 is coupled to public switched telephone network 207. The telephone network is coupled to a phone processor 208 for receiving calls initiated by the IRDs in the network. The phone processor may comprise, for example, a Scientific Atlanta Model 8554-001 Phone Processor, available from the assignee of the present application. A current implementation utilizes eight model 8554-001 processors to handle incoming calls. A phone manager computer 209 such as a Compaq ® SystemPro ™ controls phone processor 208.

Phone manager computer 209 is coupled to business system computer 210 for compiling and processing billing information to bill subscribers. Phone manager 209 is also coupled to a subscriber authorization computer (SAC) 211 which controls, for example, the authorization of subscribers to receive particular programming. Subscriber authorization computer 211 contains information such as program tiers for a current month, credit limits, service tiers, call-in billing group, call-in time zone, call-in phone number, and store and forward disable for decoders in the network. Subscriber authorization computer 211 is coupled to MAC encoder 201 to permit communication between computer 211 and the IRDs in the network over satellite link 205. Finally, a system supervisory control computer 212 coupled to phone manager 209 and MAC encoder 201 controls the encoding equipment and generates schedules and changes in system data.

Data or commands are transmitted to decoders in the network over satellite link 205 in at least two ways. In a first way, system data generated by supervisory control computer 212 carries program specific data for the channel currently tuned by a decoder. In a second way, addressed data packets (ADPs) are used to deliver decoder specific information to a single decoder. Each decoder in the network is assigned a unique user address and a matching secret serial number (SSN). When an addressed packet with an address matching the user address of a decoder is received, the packet is decrypted with the SSN. The packets preferably include a checksum which is used to verify both correct reception and decryption with a matching SSN. Typically, system data originates from supervisory control computer 212 as noted, while addressed data packets originate from subscriber authorization computer 211, although the invention is not limited in this respect.

Figure 10:
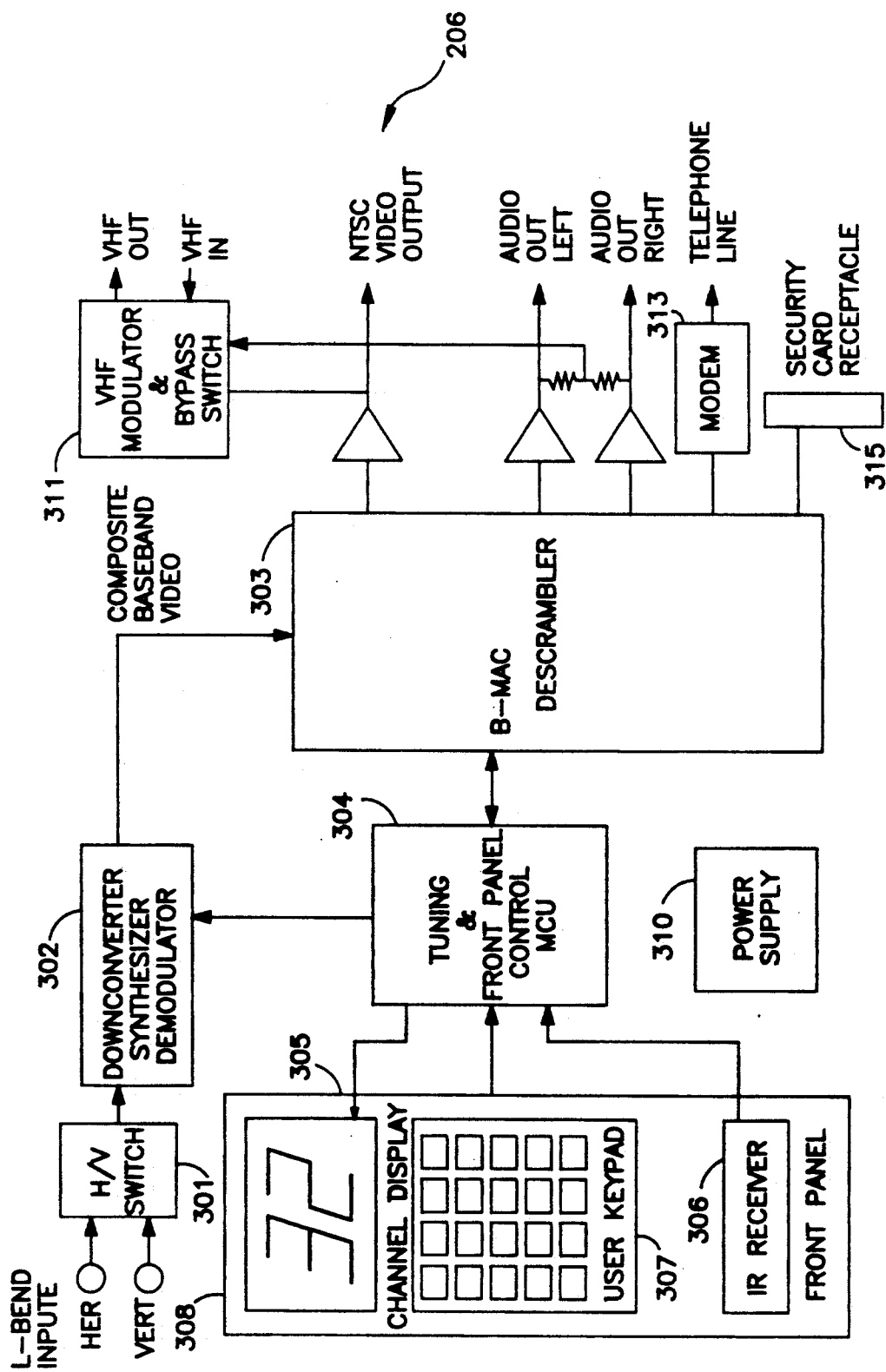
FIG. 10 is a block diagram of the integrated receiver decoder of FIG. 9.

FIG. 10 is a block diagram of B-MAC IRD 206 shown in FIG. 9. H/V switch 301 switches between the horizontal and vertical polarities of the incoming transmission over satellite link 205. The incoming signal then passes to block 302 including a downconverter, a tuner, and demodulator. The downconverter and tuner select a channel from the incoming signal and lower it to some intermediate frequency (IF). The tuner may, for example, comprise a synthesized tuner. The demodulator demodulates the signal to generate composite baseband video which is input into B-MAC decoder 303. Front panel 305 includes an IR receiver 306, user keypad 307, and LED display 308. IR receiver 306 is adapted to receive control signals from an associated IR remote control (not shown). User keypad 307 includes a plurality of keys 310 for permitting the subscriber to input, for example, channel selections and volume control. LED display 308 displays the tuned channel and may display other information such as time. Power supply 310 supplies power to IRD 206.

Figure 1:
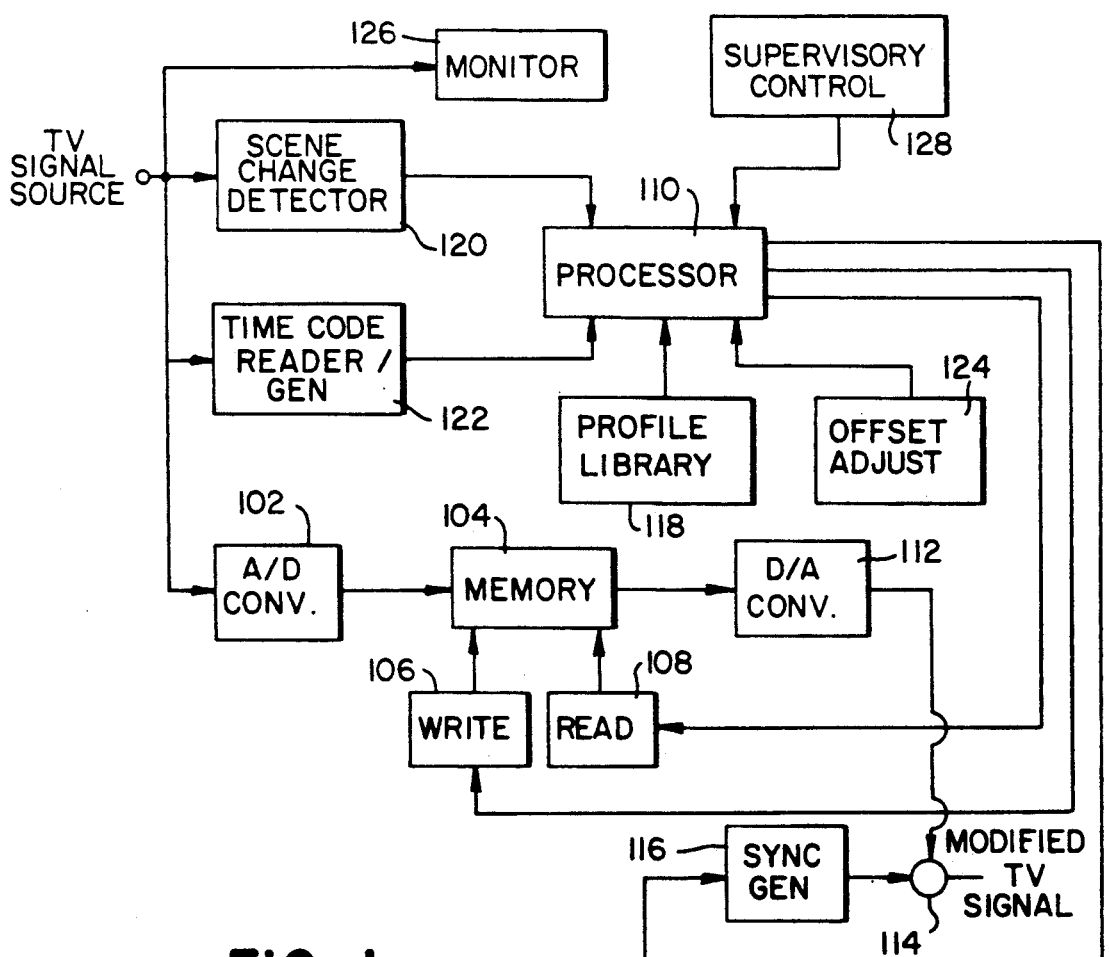
FIG. 1 is block diagram of a prior art anti-taping system.
Figure 2:
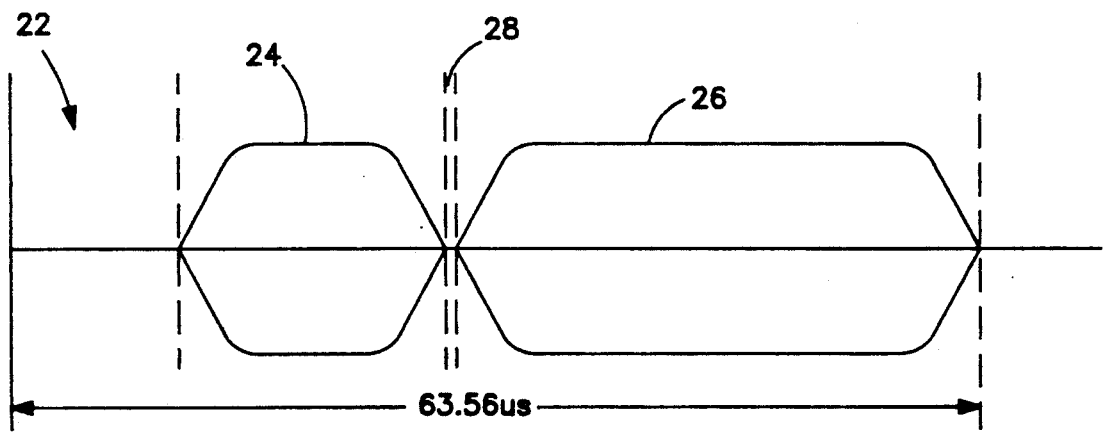
FIG. 2 is an amplitude-vs.-time diagram of a single video line of a typical MAC color television signal.
Figure 3:
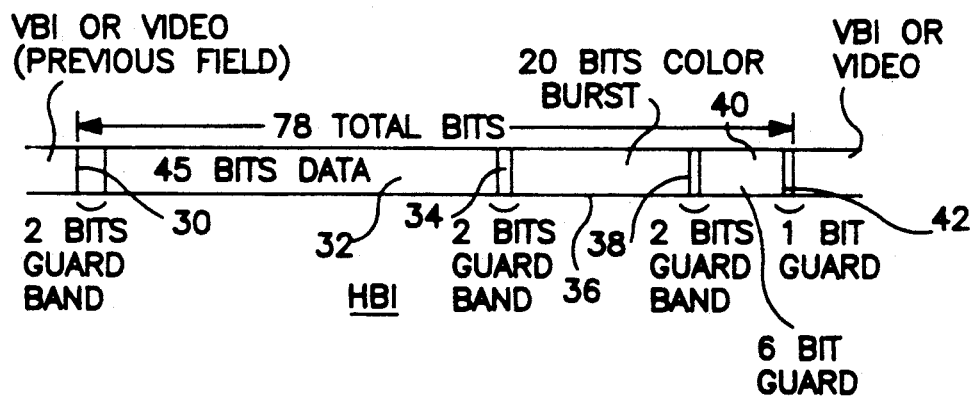
FIG. 3 shows in broad outline the format of the horizontal blanking interval.
Figure 4:
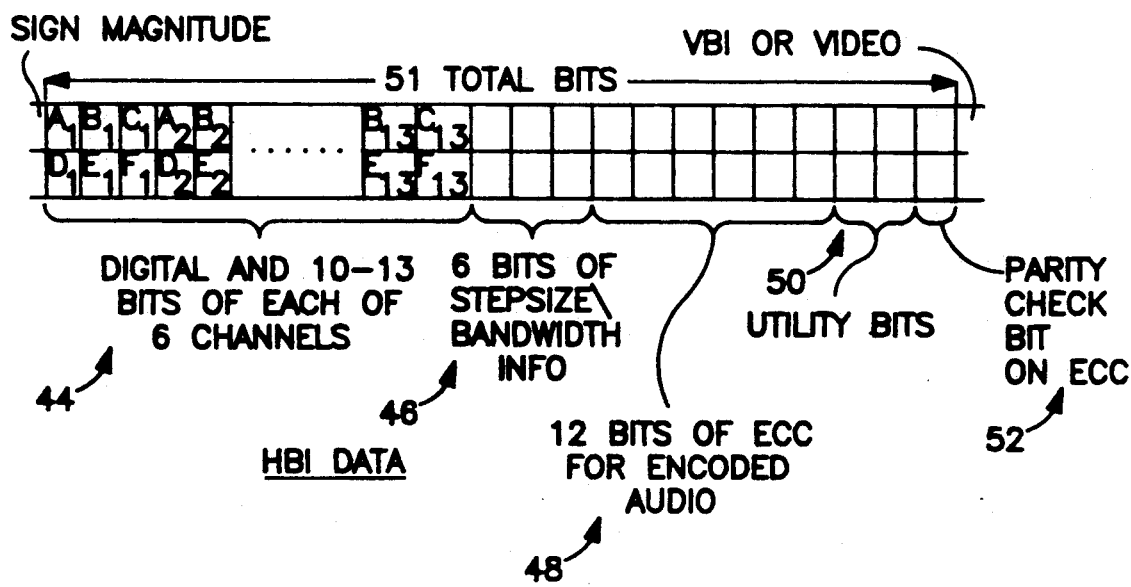
FIG. 4 shows additional details of the format of the horizontal blanking interval.
Figure 5:
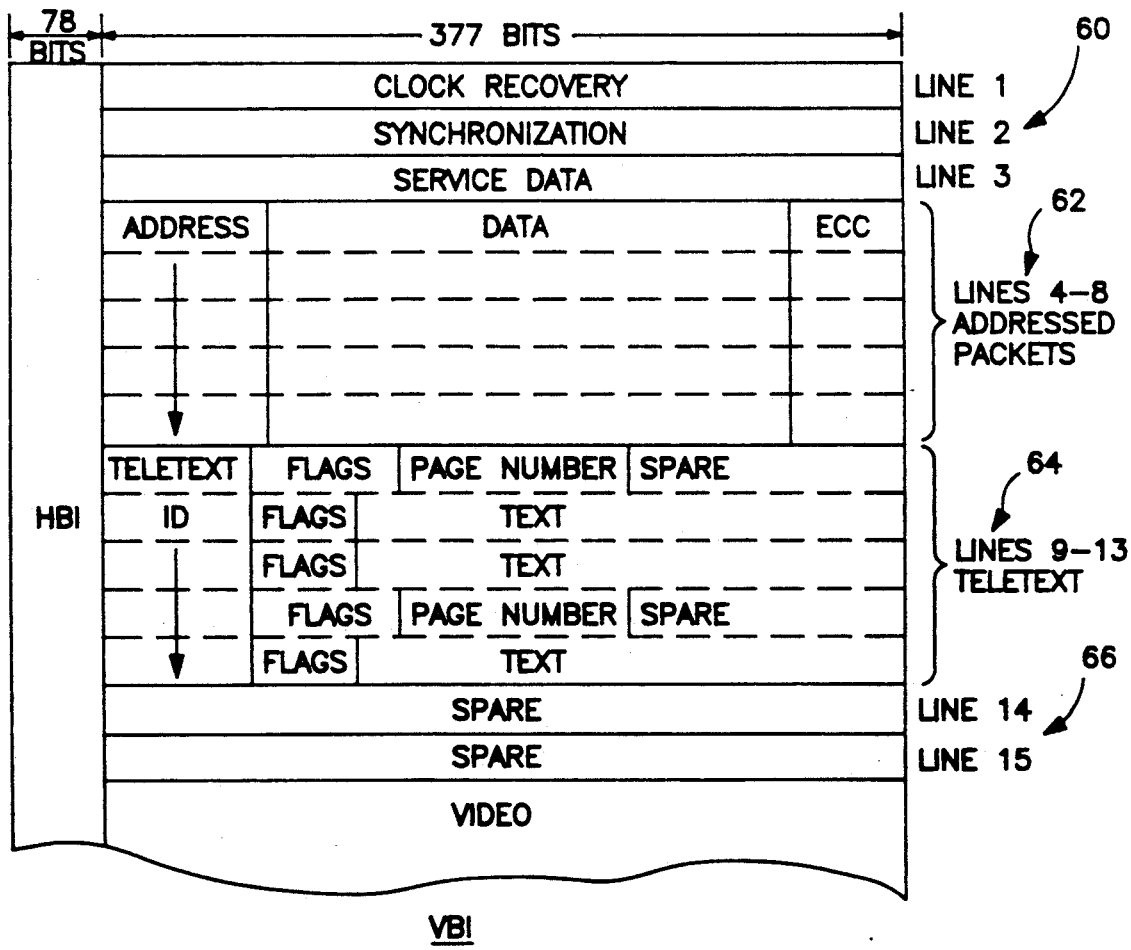
FIG. 5 shows an overview of the material carried in the sixteen lines of the vertical blanking interval.

A tuning and front panel control processor 304 may comprise a MC68HC05C4 and tunes the transponder tuner in block 302, scans front panel keypad 307 and any remote keypads for keystrokes, drives LED display 308 and provides volume control. Keystroke interpretation is generally performed by display control processor (DCP) 405 (see FIG. 4), except for volume control, which is internal to tuning processor 304. Volume control keystrokes are passed to DCP 405, but function only to instruct DCP 405 to un-mute audio.

B-MAC decoder 303 decodes the composite baseband video input thereto and outputs NTSC video and audio as shown. VHF modulator 311 modulates the video and audio outputs of B-MAC decoder 303 for reception by television receiver 220 (FIG. 9). Modem 313 allows IRD 206 to interface with the public switched telephone network to permit communication between IRD 206 and a system operator. For example, billing information related to impulse pay-per-view purchases may be transferred to the system operator. Alternatively, information from the cable operator may be transferred to IRD 206 over the telephone network. B-MAC decoder 303 is also coupled to a security card receptacle 315 for receiving an insertable security card.

A description of the insertable security card and its operation are described in commonly assigned copending Application Ser. No. 07/677,460 filed concurrently herewith and entitled "Independent External Security Module For A Digitally Upgradeable Television Signal Decoder", which is incorporated herein by reference.

Figure 11:
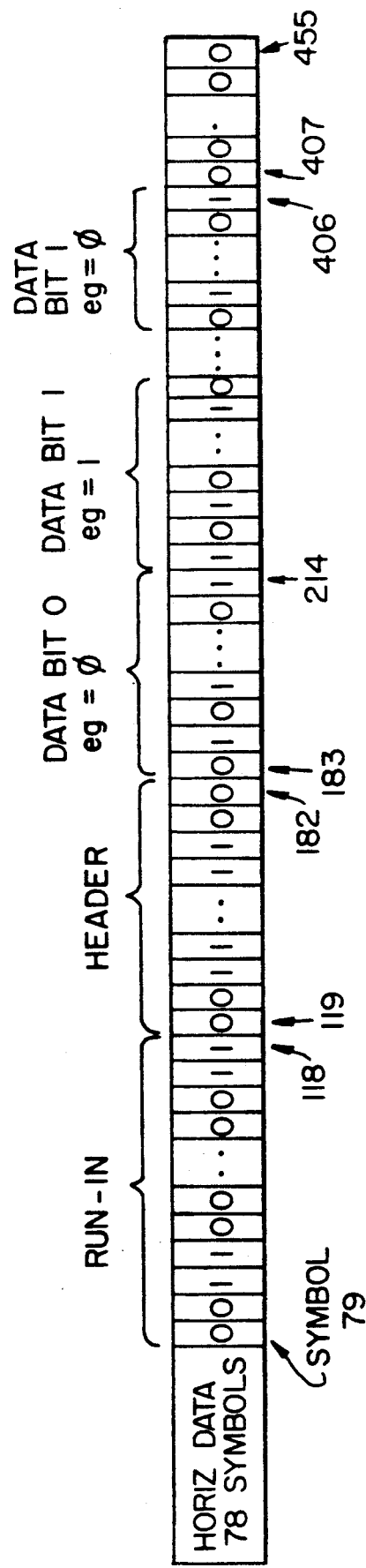
FIG. 11 illustrates the format of VBI line 14 in accordance with the present invention.

In accordance with the present invention, anti-taping control information is sent in the vertical blanking interval on line 14 of each field. FIG. 11 illustrates the format of the data on line 14 of the VBI. The code comprises seven bits and is sent after a header. The data instructs the decoder what to do in terms of compensation. The first 78 symbols are horizontal data. The run-in is a dc free run-in code which allows the recovery of data without any dc restoration. The header identifies the line as a control line for anti-taping. If desired, other data may be interleaved with the anti-taping control codes by use of different headers. Data bits 1 through 7 then follow. A data bit of "0" is a sequence of "0101 . . ." for thirty-two symbols and a data bit of "1" is a sequence of "1010 . . ." for a total of thirty-two symbols. This format was chosen for error protection. Bits 407–455 are unused bits which may be set to zero.

Bits 0–3 define a four bit value which describes the deviation in pairs of lines from the normal MAC field length and may be either positive or negative. The four bits represent a two's complement number that when added to the normal MAC field length indicate the length of the transmitted MAC field. Bits 4 and 5 define a number of lines which must be added to the transmitted MAC signal to obtain the output video field length. These two bits represent a two's complement number that when added to the transmitted MAC field length give the value of the output field length. Thus, the output video may be different or offset from the transmitted video.

Bit 6 is the MAC compensation bit. If the bit is zero, the fields are lined up. If the bit is one, the MAC field ends one line earlier than the NTSC field being output. The MAC compensation bit is used to indicate whether or not the end of the MAC field occurs at the same time as the end of the NTSC field being output by the decoder.

Figure 12:
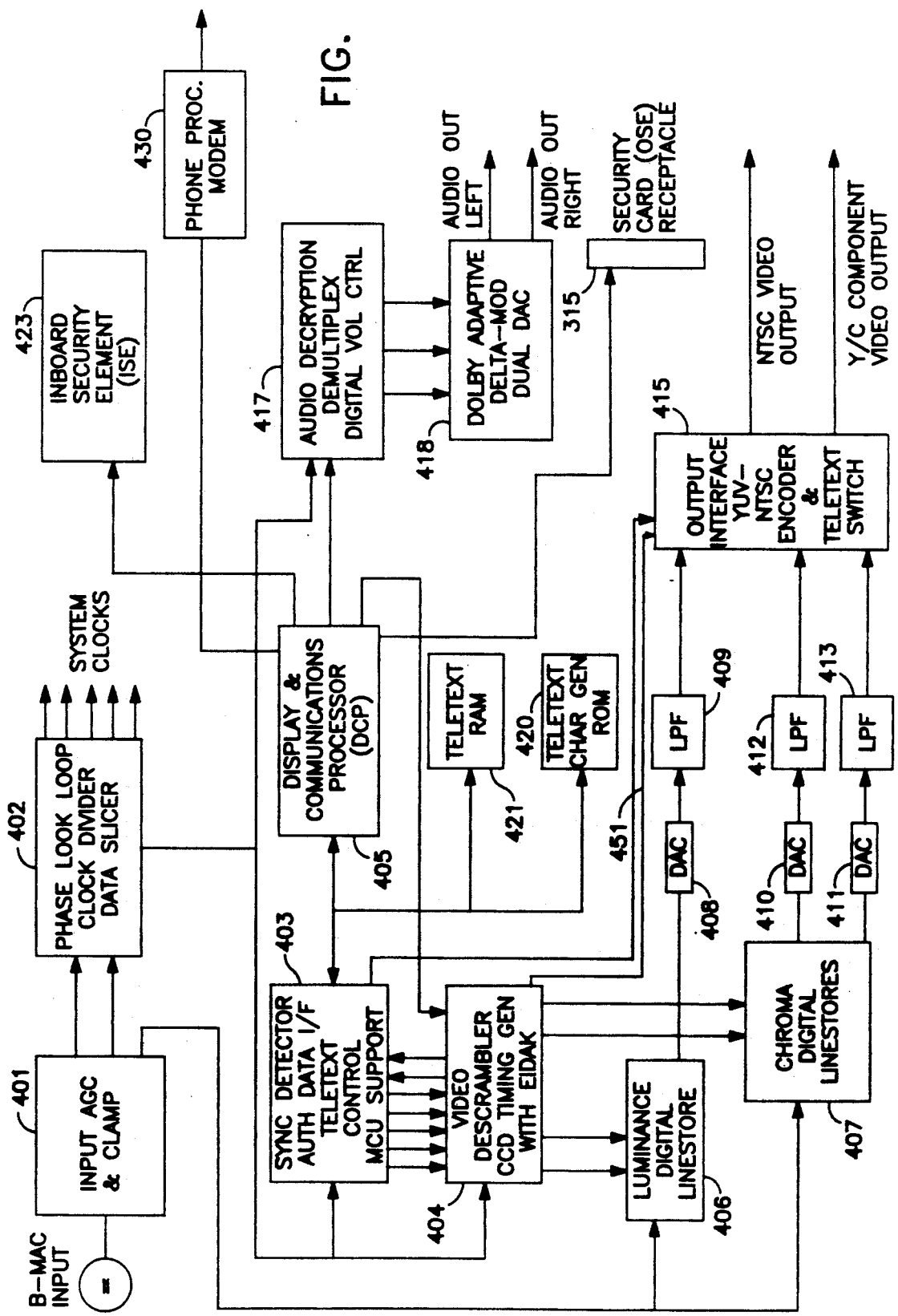
FIG. 12 is a block diagram of the descrambler shown in FIG. 10.

FIG. 12 is a detailed block diagram of B-MAC descrambler 303 of FIG. 10. The baseband B-MAC signal is input to AGC and clamping block 401 for performing well-known gain control and clamping operations. Block 402 includes a phase lock loop and a clock divider for generating system clock signals used in decoder operation. Attention is directed to U.S. Pat. No. 4,652,903, assigned to the assignee of the present application and incorporated herein by reference, for a description of a technique of generating clock signals. Block 402 also includes a data slicer for providing data contained in the incoming signal to microprocessor and teletext support interface (MATS) 403 and video descrambler 404. Video descrambler 404 is a timing chip which controls reading and writing of video in luminance linestore 406 and chrominance linestore 407 and also generates output synchronization signals. That is, video descrambler regenerates horizontal and vertical synchronization signals and supplies them to output interface 415 via line 451. MATS 403 passes the information on line 14 to video descrambler 404. Video descrambler 404 receives and interprets data contained on line 14 from MATS 403 to determine (1) when video is coming in, (2) when to write and read information from linestores 406 and 407, and (3) when to insert the appropriate vertical sync timing.

The anti-taping process affects teletext as well as video. To center the text in the active video region, the text must be moved down if there are more lines of video and moved up if there are fewer lines of video. Teletext character generator is provided with the appropriate information from line 14 of the video signal by information sent from video descrambler 404 back to teletext control 403 in order to appropriately position text.

MATS 403 performs data error correction and data formatting on both incoming system data and addressed data packets and supplies the corrected and formatted data to display and communications processor (DCP) 405. DCP 405 may comprise a MC68HC11E9 and performs overall control of the other processors of decoder 303 and of all user interfaces.

The luminance and chrominance signals of the B-MAC signal are respectively provided to liminance digital linestore 406 and chrominance digital linestore 407. The decompressed luminance signal is provided to digital-to-analog converter 408 and then to low pass filter 409, where it is filtered. The analog luminance signal then goes to output interface 415. The sampling signals necessary to decompress luminance are produced by a timing generator in block 404 controlled by the line 14 data and supplied to luminance digital linestore 406 by clock drivers.

The chrominance signal is decompressed in digital chrominance store 407. Separate outputs are provided for the two color difference signals, which are passed through respective digital-to-analog converters 410 and 411. The color difference signals are then respectively passed through low pass filters 412 and 413, where they are filtered. The filtered signals are provided to output interface 415. The necessary sampling signals are supplied to chrominance store 407 from a timing generator in block 404 through clock drivers. Audio information is provided to block 417 including an audio decryptor, a demultiplexor and a digital volume control. The audio information then passes to block 418 including a Dolby ® adaptive delta modulation. Teletext character generator ROM 420 and teletext RAM 421 are coupled to DCP 405 and MATS 407 for providing teletext characters to output interface 415 in accordance with teletext information contained in the incoming B-MAC signal. Output interface 415 outputs a standard NTSC video output. DCP 405 is also coupled to inboard security element (ISE) 423 and receptacle 315 for receiving an outboard security element (OSE). The ISE and OSE and their operation are discussed in detail in the above-identified copending application Ser. No. 07/677,460. Generally, only one of the ISE or OSE is active at a given time. Finally, DCP 405 is coupled to a phone processor 430 for interfacing the decoder and the public switched telephone network. Phone processor 430 may comprise a MC68HC05C4 and controls modem communication and tone generation. Since the modem transfers billing information representing revenue to the cable operator, telephone communications are preferably encrypted for security. The encryption takes place in one of ISE 423 or the OSE processors (whichever is active) before being passed to the modem. If the modem is utilized to receive information, such information is passed on verbatim to ISE 423 or the OSE. The active security element may initiate a call when commanded by system data or by an addressed data packet. The inactive security element may initiate a call only when commanded by an addressed data packet.

Figure 13:
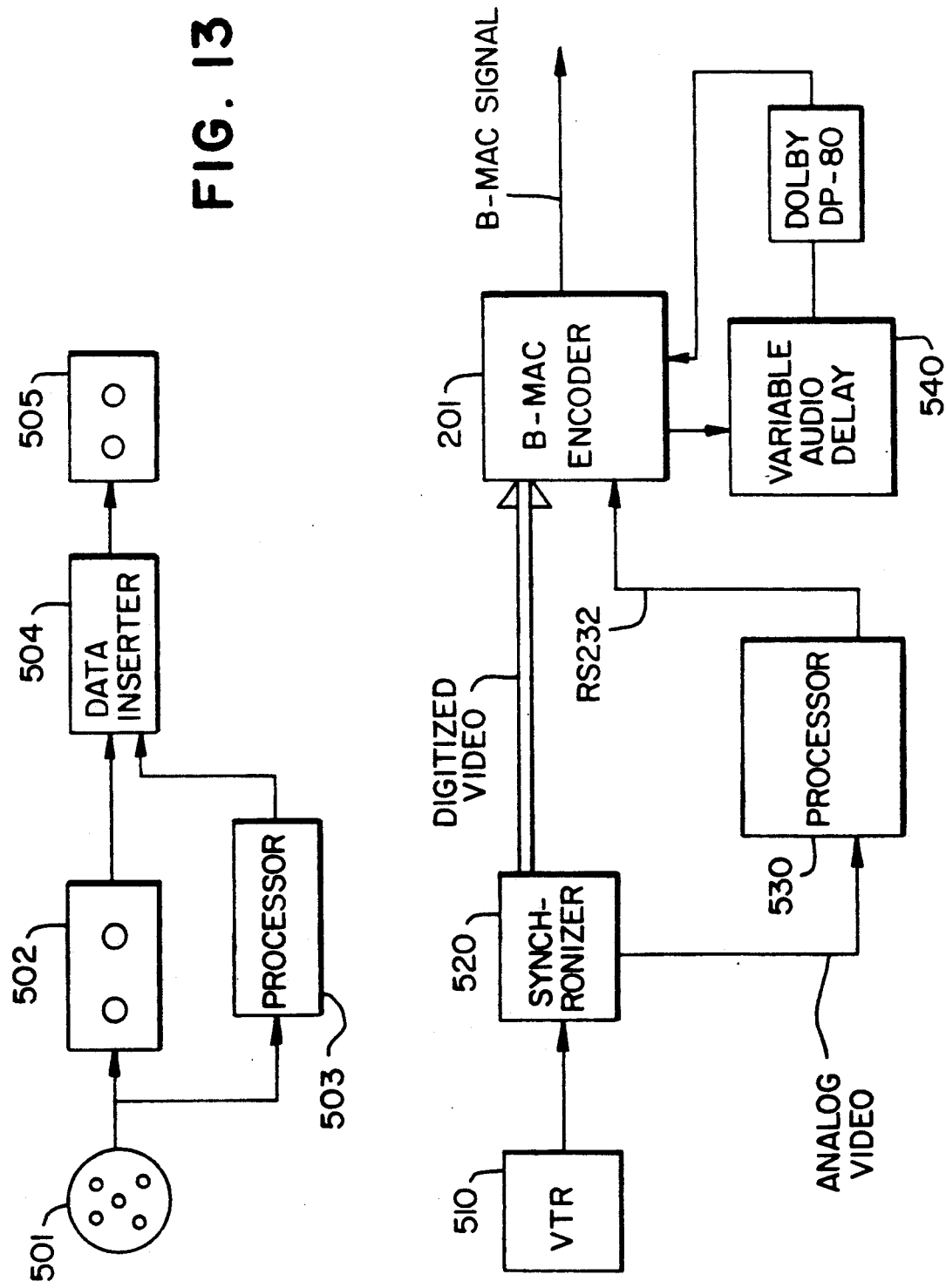
FIG. 13 is a detailed block diagram of a system headend.

FIG. 13 is a block diagram of an arrangement for generating a MAC signal which may be viewed on a television receiver but which prevents unauthorized taping of the programming. A signal source such as film 501 is transferred to tape 502 in accordance with conventional techniques. In accordance with the scene changes and/or motion, processor 503 generates output data with respect to changes in the number of horizontal lines per field. This output data is appropriately combined with the information recorded on tape 502 at data inserter 504 to produce a tape 505. Tape 505 constitutes one type of source program 202 for transmission over the satellite link 205.

Tape 505 is placed into a VTR 510. The analog output video of VTR 510 is supplied to a synchronizer 520 such as a DPS 260 available from Digital Processing Systems. Synchronizer 520 synchronizes the video input thereto to a reference and outputs a digitized video signal. The analog video signal is also passed through synchronizer 520 and output to processor 530. The analog signal input to processor 530 is taken from synchronizer 520 in order that the analog and digital video signals be in synchronization. The analog video signal is supplied to processor 530 in order to read the data relating to the number of horizontal lines per field. Processor 530 is an ordinary personal computer with the capability to read the field change data on the analog video signal. Processor 530 transmits the frame change data over an RS 232 link at 9600 baud to B-MAC encoder 201, which is also supplied with the digitized video.

The communication packets between processor 530 and B-MAC encoder 201 include data related to ramping profiles for smoothly changing the number of lines per field of the television signal. The information packet includes:

(1) a resting point, the number of lines per field offset from a standard video filed, e.g., −1
(2) the maximum value of the first ramp segment, e.g. (+2, +4, +6, +8, or −2, −4)
(3) first segment duration (4 to 255 fields)
(4) second ramp segment maximum (+2, +4, +6, +8, or −2, −4)
(5) second ramp segment duration (4 to 255 fields)
(6) third ramp segment maximum (+2, +4, +6, +8, or −2, −4)
(7) third ramp segment duration (4 to 255 fields) The numbers associated with the segment maxima indicate the increase (+) or decrease (−) in the number of lines per field. The packet is preferably sent redundantly. The packet transmission ends one field before the field that triggers the profile format. The duration period of each of the above profile parameters is variable as identified.

Preferably, if a packet message is not received within thirty seconds, software of the B-MAC encoder 201 forces a default profile and repeats it every eight seconds until a new packet is received. The time out period, the details of the default profile and the repitition rate of the profile are all variable through console. The default profile contains a negative duration of 24 fields at −4 and a positive duration of 90 fields +8, after which the profile returns to the resting point of −1. This profile is not generated if the system is not in the copy protection mode. If the time between scene changes is greater than thirty seconds and a default profile is not required, then processor 530 sends a null packet before the time out period expires. In a null packet, the negative and positive maximum duration bytes are set to zero.

If a second profile command packet is received from processor 530 prior to the end of a first profile generation, a second profile is generated which occurs immediately at the end of the first profile without a pause at the minus one rest point. The direction of the starting offset value of the second profile is preferably opposite to that of the ending offset value of the previous profile.

The ramping profiles discussed above vary from the rest point of minus one line count in the following manner. It ramps smoothly, one line per field from the minus one line count point to the first new line count offset value (either +2, +4, +6, +8 or −2, −4) as specified in the profile information sent to B-MAC encoder 201 by processor 530. It will then stay at that point for the duration specified. At the end of the duration, it will ramp smoothly to the next specified offset value and wait at that point for its specified duration time. At the end of this duration time, it will ramp smoothly to a third offset value where it will remain for the specified duration time. If the third offset value and duration is zero, the segment will be ignored. The last segment of a profile will always ramp smoothly back to the minus one resting point after its duration has been completed.

Preferred ramping profiles are illustrated in FIGS. 16(A)–16(F). With reference to the ramp up to +8 at the first scene change shown in FIG. 16(A), it can be seen that initially the deviation from the standard number of television lines in each field is zero when the anti-taping technique is switched OFF or when the anti-taping technique is switched ON and before the first profile occurs. To turn the anti-taping technique ON profiles 16(A) and 16(B) are required. In field A of the second frame, the ramp-up to +8 begins. It can be seen that the change in lines is incremented by one for each field until +8 is reached. The display offset represents the offset in the number of lines in the identified field. After the second frame, it can be seen that the change in lines is equal to two. To implement this change in lines, the display in each field of the next frame is offset by one. After the second frame, the change in lines is equal to four. To implement this change in lines, the display in each field of the next frame is offset by two. This process continues until the change in lines is equal to eight whereby the display in each field of the ensuing frames is offset by four. As indicated, the duration of the stay at +8 lasts for 96 fields.

After 96 fields, there is a ramp down to −1 as illustrated in FIG. 16(B). This is accomplished by smoothly changing the number of lines from +8 to −1. It can be seen that after the second frame of the second profile, the change in lines is equal to six. Thus, in the third frame, the display in each field of the next frame is offset by three. As indicated, the duration at −1 is 300 fields.

FIG. 16(C) illustrates a ramp down to −4 which is maintained for 16 fields. FIG. 16(D) illustrates a ramp up from −4 to +8. As indicated, the duration at +8 is 96 fields. FIG. 16(E) illustrates a ramp from −4 to 0 at the final scene change. Thus, to switch the anti-taping technique OFF, profiles 16(C) and 16(E) are needed. Reference to FIG. 16(F) illustrates that the ramping profiles illustrated in FIGS. 16(B)–(D) are repeated at scene changes throughout the program.

It can be seen that the display shift of frame N is given by:

$$\text{display shift} = \frac{\text{delta lines field } B \text{ of } N - 1}{2}$$

Figure 14:
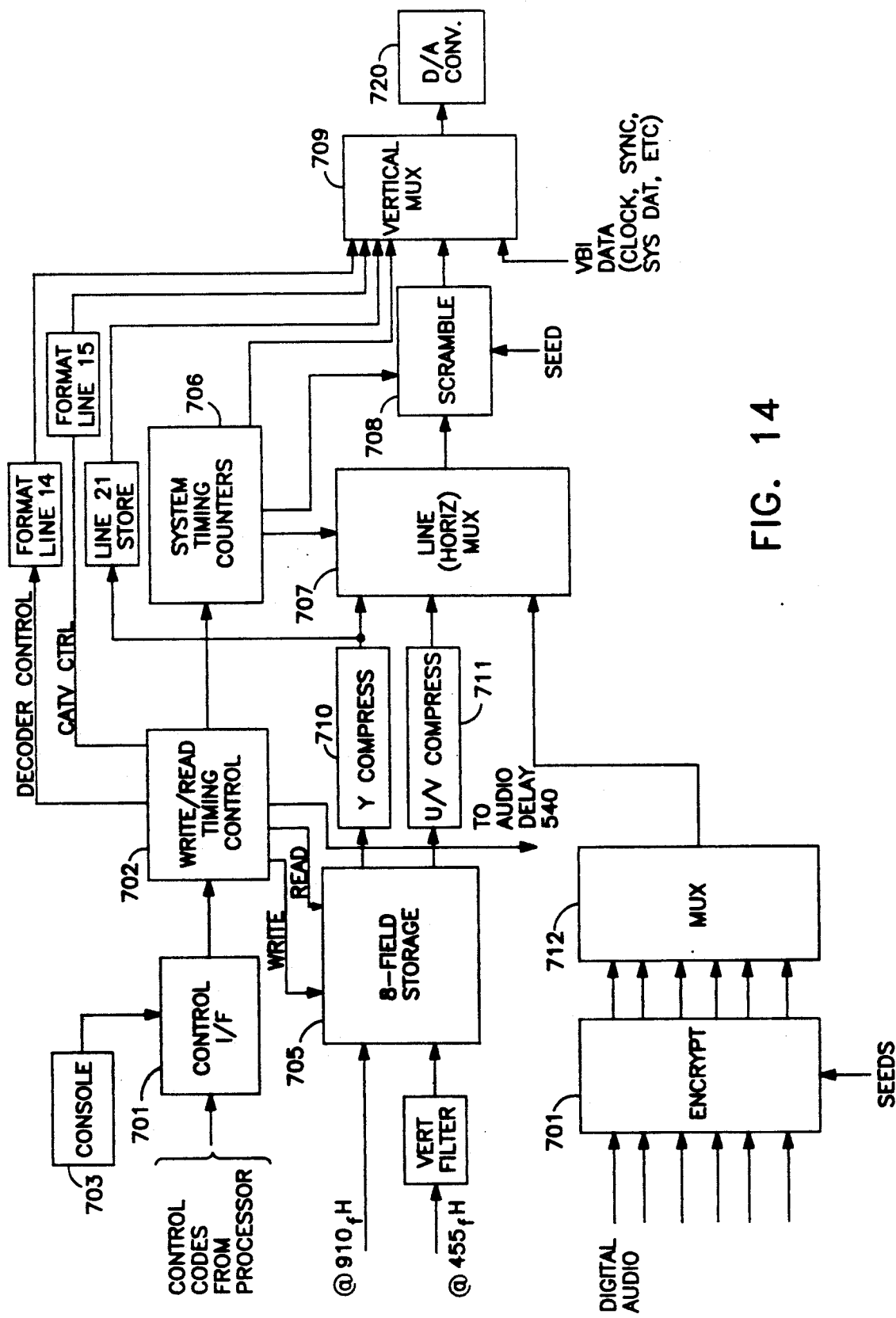
FIG. 14 is a block diagram of the B-MAC encoder of FIG. 13.

An encoder in accordance with the present invention is shown in FIG. 14. The luminance and chrominance information are respectively supplied from synchronizer 520 at 910 $f_h$ and 455$f_h$ to an eight field storage 305. It will be apparent that storage 705 may comprise storage for various numbers of fields. When the eight field store fills up when signals are output at a slower rate than are being input, an incoming frame may be dropped. By the time the next frame is being read in, information will have been read out and this next frame may be input. Thus, when there is not enough room in the eight field store for the entire frame, that frame is dropped. Similarly, when signals are being read out at a faster rate than they are being read in, it is possible for a frame to be repeated. The writing of the information to storage 705 is controlled by write/read timing control 702 which causes the information to be written at the normal incoming video rate. Write/read control 702 controls the information to be read out of storage 705 at a rate determined in accordance with the signals from processor 530. Since the field rate is being effectively slowed down or sped up, the information may be read slower or faster than it is written in. This operation is under the control of the control interface which receives instructions from the external processor 530. Console 703 may be used to enter a default profile and to turn the anti-taping control ON or OFF. Write/read control 702 also is coupled to system timing counters 706. Counters 706 control, for example, line horizontal multiplexer 707, scrambler 708 and vertical multiplexer 709. The field timing is supplied by the write/read timing control 702. Compression of the luminance and chrominance is performed at 710 and 711, respectively, and the resultant signals are multiplexed with audio by line multiplexer 707. Digital audio is encrypted at 701 and the different channels are multiplexed by multiplexer 712 and supplied to line multiplexer 707. The output of multiplexer 707 is provided to scrambler 708 for scrambling.

When the output signal of scrambler 708 reaches the vertical multiplexer 709, it is varying in time and thus the VBI data must be supplied varying in time. The decoder control information of line 14 is supplied to vertical multiplexer 709.

CATV control data is supplied on line 15. VBI data on line 15 is used to control remote scramblers at cable headends as discussed below. The information provided includes the line on which the video starts on and on which the video ends. The offset is also provided. This information is sent once every field. The VBI data of line 15 starts at 11.2 microseconds from the leading edge of the horizontal sync in line 15. The bit rate change is 558.7 nanoseconds per bit. The signal level preferably changes from 0 IRE for a logic zero to 80 IRE for a logic one.

Most television signals carry on line 21 a closed caption data signal for the hearing impaired. The carrying of this data is important and the varying of the field length must not interfere with recovery of this data. The B-MAC encoder takes line 21 data and no matter what else is done to VBI, line 21 is always reinserted on line 21 so that closed captioned decoder can find line 21 data. The line 21 store is told where line 21 is coming in on incoming video and it supplies the information on the 21st line of every field regardless of where the video ends up.

The output of vertical multiplexer 709 is supplied to D/A converter 720 which outputs an analog B-MAC signal.

CATV scrambler control information generated in line fifteen of the output video must be made synchronous with the output data, i.e., the information which tells the CATV scrambler what is happening to video in terms of frame variation must exactly coincide with the actual video being transmitted. The B-MAC encoder must generate this information and it cannot be provided from the VTR itself since the B-MAC may, for example, drop fields as discussed above. However, the B-MAC encoder knows exactly how many lines are being sent out in a given field and this information must be provided to the CATV scrambler.

Figure 15:
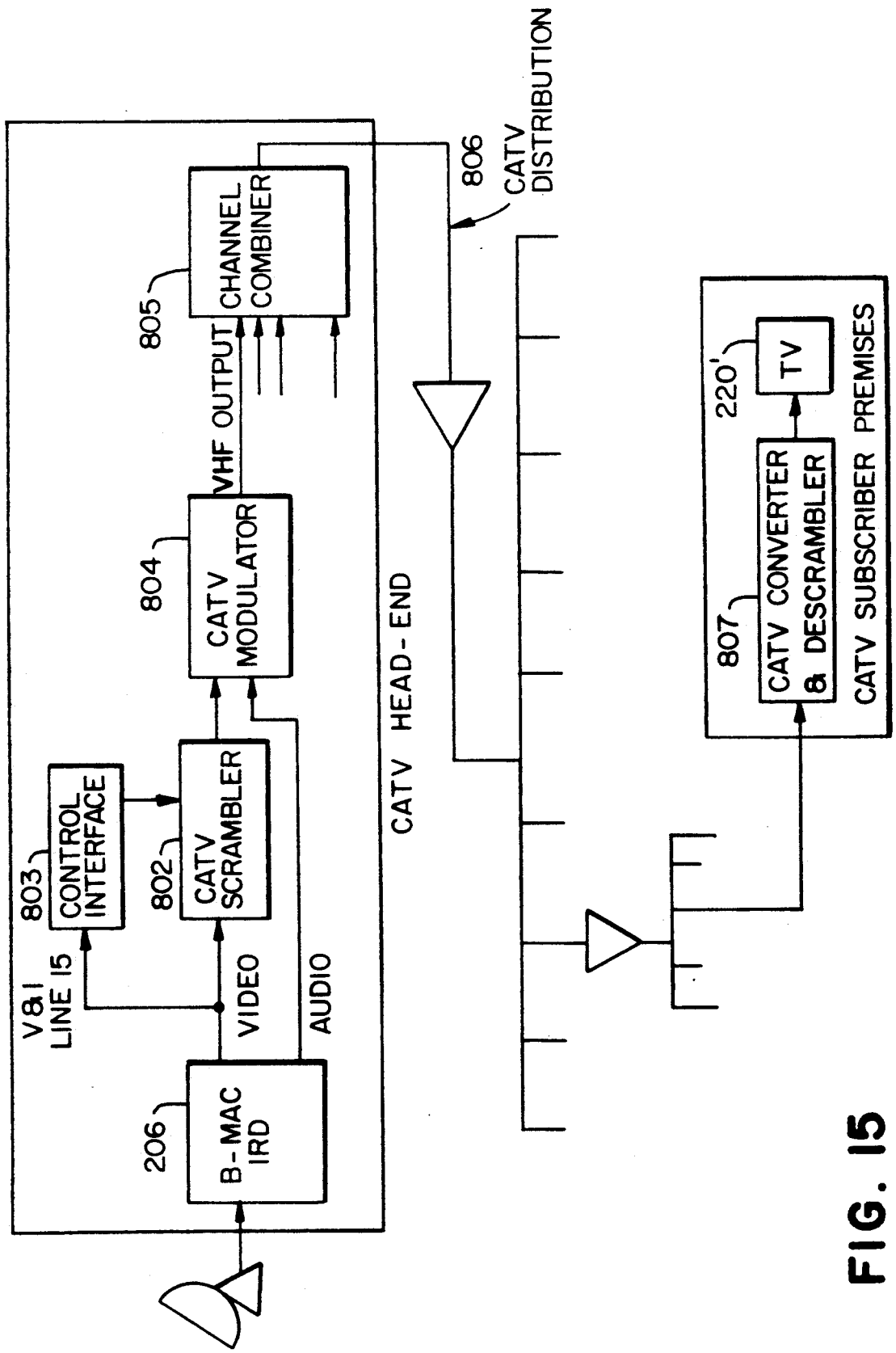
FIG. 15 is a block diagram of an embodiment of the present invention for use in providing signals to a CATV headend.

A system incorporating a CATV scrambler is shown in FIG. 15. In FIG. 15, the video output of B-MAC IRD 206' is provided to a CATV scrambler 802. The information contained on line 15 of the VBI is interpreted by control interface 803 and provided to CATV scrambler 802. The audio output of IRD 206' and the output of scrambler 802 are provided to CATV modulator 804. The VHF output of modulator 804 is provided to channel combiner 805 for transmission over cable distribution 806. A CATV converter and descrambler 807 on the subscriber premises output video and audio to TV 220'.

Returning to FIG. 13, encoder 201 interfaces with Eventide H3000B variable audio delay unit 540. Because of the elastic nature of the eight field video store, audio must be controlled. Audio delay commands are issued in real time to compensate for the video to audio delay caused by the system. Audio-video time differential is defined as the departure from equality in the transmission time of associated audio and video signals. It is usually expressed as a delay of the video signal with respect to the audio signal. The acceptable limits of audio delay are those specified in Section 6.6 of EIA standard 250-B. The video-audio delay is determined by the encoder write/read control 702 unit in accordance with instructions from processor 530.

Sync recovery is described in commonly assigned U.S. Pat. No. 4,697,277, incorporated herein by reference. However, when the number of lines per frame is varied as discussed above, sync pulses from system counters and from the incoming signal can differ. When this occurs, a hysteresis circuit provided in the decoder for noise immunity will eventually determine that synchronization is lost. However, until the hysteresis circuit determines synchronization is lost and initiates an attempt to regain synchronization, the descrambler has actually been unsynchronized. In order to overcome this, information sent on line 14 of the video signal is recovered by MATS 403 and passed to video descrambler 404. Video descrambler 404 interprets the information to control the video and output timing and returns to MATS 403 information regarding the characteristics of the next field since the sync recovery circuitry must be informed every field as to what the offset is. This allows continued, accurate and stable synchronization.

Further, it is desirable to change the field lengths in increments of two lines rather than one line or other odd number. The 3.58 MHz clock frequency alternates in phase every other line. If a field is changed by an odd number of lines, the clock signal on one line may be 180° out of phase with the clock signal on the next line which will deleteriously affect sync recovery.

Although illustrative embodiments of the present invention have been described in detail with reference to the accompanying drawings, it is to be understood that the invention is not limited to those precise embodiments and that various modifications may be effected therein by those in the art without departing from the scope and spirit of the invention.

We claim:

1. An apparatus for generating a multiplexed analog component video signal, comprising:
    storing means for storing luminance and chrominance information of lines of an input video signal;
    a write/read control circuit for controlling writing of the luminance and chrominance information to said storing means and the reading of the luminance and chrominance information from said storing means, said write/read control circuit selectively reading the luminance and chrominance information from said storing means at a rate which is different than a rate at which the luminance and chrominance information is written to said storing means to vary a number of lines per field of the input video signal;
    first means for respectively compressing the luminance and chrominance information read from said storing means and generating a multiplexed analog component video signal and said first means including means for providing information present on at least one predetermined line of the input video signal to the same predetermined line of the multiplexed analog video signal even if the number of lines per field is varied in accordance with said write/read control circuit.

2. The apparatus according to claim 1, wherein the predetermined line of the input video signal has closed caption data.

3. The apparatus according to claim 1, wherein said first means comprises:
    a horizontal multiplexer for multiplexing the luminance and chrominance information; and
    a vertical multiplexer for multiplexing the multiplexed luminance and chrominance information and VBI data.

4. The apparatus according to claim 3, wherein the predetermined line of the input video signal is provided to said vertical multiplexer for multiplexing at a time corresponding to the same predetermined line of the multiplexed analog video signal.

* * * * *